United States Patent [19]

Hoxmeier

[11] Patent Number: 5,296,574
[45] Date of Patent: Mar. 22, 1994

[54] METHOD OF SYNTHESIS OF BLOCK COPOLYMERS OF VINYL AROMATIC HYDROCARBONS AND POLYDIMETHYLSILOXANE

[75] Inventor: Ronald J. Hoxmeier, Houston, Tex.

[73] Assignee: Shell Oil Company, Houston, Tex.

[21] Appl. No.: 990,587

[22] Filed: Dec. 15, 1992

[51] Int. Cl.$^5$ .................................. C08L 83/10
[52] U.S. Cl. ........................ 528/25; 528/14; 525/100; 525/106; 525/105
[58] Field of Search ............... 525/479, 100, 105, 106; 528/14, 25

[56] References Cited

U.S. PATENT DOCUMENTS

| | | | |
|---|---|---|---|
| 3,051,684 | 8/1962 | Morton et al. | 528/14 |
| 3,483,270 | 12/1969 | Bostick | 525/479 |
| 3,665,052 | 5/1972 | Saam et al. | 525/479 |
| 3,691,257 | 9/1972 | Kendrick | 525/479 |
| 3,760,030 | 9/1973 | Dean | 525/479 |
| 3,928,490 | 12/1975 | Hergenrother | 525/479 |
| 4,143,089 | 3/1979 | Martin . | |
| 4,148,838 | 4/1979 | Martin . | |
| 4,263,401 | 4/1981 | Chaumont et al. . | |
| 4,273,896 | 6/1981 | Martin . | |
| 4,768,750 | 11/1990 | Eichenauer et al. | 525/479 |

OTHER PUBLICATIONS

Polymer Letters, vol. 8, pp. 677-679, 1970.
J. C. Saam, D. J. Gordon, S. Lindsey, *Macromolecules*, 3 (1), pp. 1-4 (1970).
I. Jansen, G. Lohmann, K. Rühlmann, *Siloxanes with Functional Groups. V. Long-term Stabilization of Polymers. I. Preparation and Properties of Styrene-Siloxane Block Copolymers*, Plaste Kautsch, 31(12), pp. 441-447.
P. Bajaj, S. K. Varshney, A. Misra, *Block Copolymers of Polystyrene and Poly(Dimethyl Siloxane). I. Synthesis and Characterization*, J. of Poly. Sci.: Polymer Chem. Ed., vol. 18, (1980) pp. 295-309.

*Primary Examiner*—Ralph H. Dean
*Attorney, Agent, or Firm*—Donald F. Haas

[57] ABSTRACT

A method for producing, in the presence of both monomers, a block copolymer of a polymer block of a vinyl aromatic hydrocarbon (and/or a conjugated diene) and a block of polydimethysiloxane which comprises adding a vinyl aromatic hydrocarbon, an organo alkali metal promoter, hexamethylcyclotrisiloxane and a polar promoter to a solvent (or to the styrene if no solvent is to be used) at a temperature of 0° to 60° C., allowing the polymerization of the vinyl aromatic hydrocarbon to proceed until the color of the vinyl aromatic hydrocarbon - Li+ species which is initially produced fades, then raising the temperature to 60° to 120° C. wherein the hexamethylcyclotrisiloxane polymerizes at the end of the polystyrene polymer blocks and then terminating the polymerization.

4 Claims, No Drawings

METHOD OF SYNTHESIS OF BLOCK COPOLYMERS OF VINYL AROMATIC HYDROCARBONS AND POLYDIMETHYLSILOXANE

BACKGROUND OF THE INVENTION

This invention relates to a process for making block copolymers of vinyl aromatic hydrocarbons and/or conjugated dienes and polydimethylsiloxane.

Linear block copolymers of polystyrene and polydimethylsiloxane have been synthesized, both by graft and block copolymerization. In block copolymerization of such linear polymers, polystyrene is produced by anionic polymerization with an organo lithium promoter in a solvent and the living polymer (PS$^-$Li$^+$) created thereby is reacted with hexamethylcyclotrisiloxane, (Me$_2$SiO)$_3$, in the presence of a polar promoter, also in a solvent, wherein a block of polydimethyl-siloxane grows on the end of the living vinyl aromatic hydrocarbon polymer block.

Such polymers incorporate the strength of vinyl aromatic hydrocarbons such as polystyrene and the high flexibility of polydimethylsiloxane and its extremely low solubility parameter compared with polystyrene. These polymers are useful for surface-inactive coatings and in impact modification of engineering thermoplastics. The present invention produces linear block copolymers of vinyl aromatic hydrocarbons and polydimethylsiloxane which are highly phase separated and have a very low Tg for the rubber black.

The manufacture of block copolymers of polystyrene and polydimethylsiloxane has, to date, necessarily involved two separate polymerization steps. First, polystyrene is anionically polymerized to the desired molecular weight and only then can the hexamethylcyclotrisiloxane be added to polymerize the polydimethylsiloxane block on the polystyrene polymer. This multiple polymerization method has been used extensively for block copolymers of vinyl aromatic hydrocarbons and conjugated dienes because polymerizing such polymers in the presence of both monomers at the same time leads to tapering between the blocks which causes poor phase separation and broad molecular weight distribution in the final polymer, thereby affecting properties negatively, e.g., low strength. It would be advantageous to be able to produce block copolymers of vinyl aromatic hydrocarbons and polydimethylsiloxane in the presence of both monomers if the polymer produced had no tapering between the blocks and an acceptably narrow molecular weight distribution.

SUMMARY OF THE INVENTION

The present invention encompasses a process for making the block copolymers discussed above. This process comprises anionically polymerizing anionic polymerization monomer(s) such as vinyl aromatic hydrocarbons, conjugated dienes or mixtures thereof to produce living polymer arms and polymerizing these living polymer arms with hexamethylcyclotrisiloxane in the presence of a polar promoter terminating the polymerization to produce a block copolymer of the monomer(s) and polydimethylsiloxane.

In the method of the present invention, the monomer(s), an organo alkali metal promoter, hexamethylcyclotrisiloxane and a polar promoter are mixed together in the solvent at a temperature of 0° to 60° C. The polymerization of the vinyl aromatic hydrocarbon and/or conjugated diene monomer(s) is allowed to proceed until the color of the monomer - Li$^+$ species (which is initially produced) fades. The temperature is then raised to 60° to 120° C. for 2 to 5 hours wherein the hexamethylcyclotrisiloxane polymerizes at the end of the vinyl aromatic hydrocarbon and/or conjugated diene monomer(s) polymer chains. Finally, the polymerization is terminated. In a highly preferred embodiment of the present invention, no solvent is used. Initially, the styrene serves as a solvent for the other components and, after sufficient polymerization of the vinyl aromatic hydrocarbon takes place, the heat of that reaction melts the hexamethylcyclotrisiloxane which then serves as a solvent for the polystyrene.

DETAILED DESCRIPTION OF THE INVENTION

As is well known, polymers containing aromatic unsaturation can be prepared by polymerizing a vinyl aromatic hydrocarbon monomer. These polymers may be prepared using anionic initiators or polymerization catalysts. Such polymers may be prepared using bulk, solution or emulsion techniques. In any case, the polymer will generally be recovered as a solid such as a crumb, a powder, a pellet or the like. Conjugated dienes may be used in place of the vinyl aromatic hydrocarbon to form polydiene/polydimethylsiloxane polymers. Mixtures of vinyl aromatic hydrocarbons and conjugated dienes may also be anionically polymerized herein. This would produce random blocks of styrene and butadiene, for example. Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3hexadiene, 4,5-diethyl-1,3-octadiene and the like. Conjugated diolefins containing from 4 to about 8 carbon atoms are preferred for use in such polymers.

In general, when solution anionic techniques are used, polymers of vinyl aromatic hydrocarbons are prepared by contacting the monomer to be polymerized simultaneously or sequentially with an anionic polymerization initiator such Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C., preferably at a temperature within the range from 0° C. to 100° C. Particularly effective anionic polymerization initiators are organo lithium compounds having the general formula:

$$RLi_n$$

wherein: R is an aliphatic, cycloaliphatic, aromatic or alkyl-substituted aromatic hydrocarbon radical having from 1 to 20 carbon atoms; and n is an integer of 1–4. Vinyl aromatic hydrocarbons which may be copolymerized include vinyl aryl compounds such as styrene, various alkyl-substituted styrenes, alkoxy-substituted styrenes, 2-vinylpyridine, 4-vinylpyridine, vinylnaphthalene, alkyl-substituted vinyl napthalenes and the like. Conjugated dienes may be used in place of the vinyl aromatic hydrocarbon to form polydiene/polydimethylsiloxane polymers. Mixtures of vinyl aromatic hydrocarbons and conjugated dienes may also be anionically polymerized herein. This would produce random blocks of styrene and butadiene, for example. Conjugated diolefins which may be polymerized anionically include those conjugated diolefins containing from 4 to 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

The polydimethylsiloxane polymer is formed by polymerizing hexamethylcyclotrisiloxane, $(Me_2SiO)_3$, in the presence of a polar promoter. The promoter can be, for example, tetrahydrofuran, ethyleneglycoldimethyl ether, N,N,N',N'-tetramethylethylenediamine, etc. Its purpose is to decrease the reaction time of the hexamethylcyclotrisiloxane. Preferably, this reaction is carried out at a temperature of from 60° to 120° C. and the amount of promoter used ranges from 100 ppm to 100% (when it is used as solvent). The temperature range is important because higher temperatures favor faster polymerization reaction times. The promoter concentration range is important because again faster reaction times are obtained.

The unique aspect of the present invention is that these two polymerizations are carried out in the same reaction mixture wherein all of the reactants and promoters are mixed together simultaneously. Thus, the vinyl aromatic hydrocarbon and/or conjugated diene monomers (for convenience, the monomers will be referred to as polystyrene hereafter) and/or the conjugated diene, the organo alkali metal promoter, the hexamethylcyclotrisiloxane and the polar promoter are mixed together. If a solvent is used, it may be selected from the solvents described above. Initially, the temperature is within the range of 0° to 60° C., preferably 0° to 25° C., to allow the polymerization of the polystyrene to proceed. At the outset, the reaction mixture takes on an orange color due to the presence of the PS⁻Li⁺ species. This preferably takes 1 to 1.5 hours. When this color fades, the polystyrene reaction is essentially complete. The temperature is then raised to 60° to 120° C., preferably 80° to 100° C., using the heat of reaction of the polystyrene polymerization and external means if necessary. After a period of 2 to 5 hours, preferably 3 to 4 hours, during which the hexamethylcyclotrisiloxane polymerizes on the ends of the polystyrene chains, the polymerization is terminated and the polystyrene/polydimethysiloxane block copolymer is recovered.

As stated above, it is highly preferred that this process be carried out in the absence of an added solvent. This has significant advantages, especially from a capital standpoint. Without the necessity of handling a solvent, the process utilizes relatively small reactors and there is no need for solvent removal facilities or solvent recycle equipment. Process cycle times are also reduced due to faster kinetics of the reaction. The reaction may take place in an extruder.

In the absence of a solvent, the styrene monomer will act as a solvent for the other components which are mixed together. The initial phase of the reaction is begun at 0° to 60° C., preferably 0° to 10° C. As the polystyrene polymerization proceeds, the heat of reaction will contribute to raising the temperature of the mixture. This reaction generally takes 0.5 to 5 minutes. Eventually, the hexamethylcyclotrisiloxane will melt (at 63° C). It then serves as a solvent for the polystyrene polymer which is being produced. As the temperature rises, the polymerization of the hexamethylcyclotrisiloxane proceeds on the ends of the polystyrene chains. This phase of the reaction is at 65° to 120° C., generally, and generally takes 2 to 5 hours.

The final part of the process is termination of polymerization. This can be accomplished by adding trimethylchlorosilane to the polymerization solution. Other methods of termination include dimethyl dichlorosilane, e.g., to make coupled tri-block polymers.

The process of the present invention works very well because styrene (and/or the dienes) reacts much faster with itself than it will with hexamethylcyclotrisiloxane. This is because the polymerization kinetics are much faster than the "crossover" reaction kinetics (the reaction between styrene or a short polystyrene chain and hexamethylcyclotrisiloxane). Unlike the block copolymerization of two dienes or styrene and a diene, tapering (or randomization which causes broad molecular weight distribution) between blocks cannot occur because the chain ends of polydimethylsiloxane cannot crossover to styrene monomer because of insufficient reactivity. If some crossover to siloxane occurs before all of the styrene monomer is consumed, the only penalty is a somewhat broader molecular weight distribution of the polystyrene block. However, the broadening of the molecular weight distribution is tolerable and allows the production of polymers at greatly reduced costs and reaction times. These polymers are useful in surface-inactive coatings and in impact modification of engineering thermoplastics.

Example 1

To a 100 ml polymerization bottle was added 10 g $(Me_2SiO)_3$ monomer, 40 g cyclohexane, 3.3 g styrene monomer and 50 mg diethoxyethane promoter (1000 ppm). The solution was titrated at 25° C. with sec-butyllithium (s-buLi) solution (1.4M) until the yellow color due to PS⁻Li⁺ persisted for about 30 seconds. Then 0.67 mmoles of s-buLi (in cyclohexane) was added to initiate polymerization.

The polymerization was allowed to proceed at room temperature with stirring until the orange color due to PS⁻Li⁺ had dissipated (about 90 min.) indicating that the styrene block polymerization was complete and that all living chain ends had crossed over to the siloxane monomer. The polystyrene block peak MW was about 5000 by gel permeation chromatography (GPC).

Then 0.5 g additional diethoxyethane was added (total promoter concentration about 1% by weight) and the reaction was heated at 80° C. for 3 hours to polymerize the polydimethylsiloxane block (PDMS). After 3 hours, 2 mmoles $Me_3SiCl$ was added to terminate the polymerization and the reaction mixture was heated at 80° C. for 30 minutes and then cooled.

GPC analysis showed the final product to have peak $M_S$ (polystyrene equivalent MW) = 12,900. The molecular weight distribution value (MWD) was 1.11 which compares well with conventional anionic polymerization values for MWD (1.01 to 1.10). The polymer was precipitated with isopropanol and dried.

EXAMPLE 2

This reaction was identical to Example 1 except that the styrene block was polymerized at 0° C. for 90 minutes. $M_s$ = 12,800 for the final product with MWD = 1.08.

The following examples describe solventless sequential PS-PDMS block copolymer polymerizations in the presence of both monomers.

EXAMPLE 3

To a 50 ml polymerization bottle was added 10 g $(Me_2SiO)_3$ monomer, 3.3 g styrene monomer and 14 mg (1000 ppm) diethoxyethane promoter. The system was cooled to 0° C. with stirring and 0.4 mmoles s-buli (in cyclohexane) was injected. A vigorous exotherm was observed with the appearance of a red color indicative of $PS^-Li^+$. Within 30 seconds the color had dissipated indicating that the styrene polymerization and the crossover reaction with siloxane monomer were both complete. This compares with 90 minutes at 0° C. in solution (Example 2). As the liquid styrene monomer was consumed, the system passed through a transient fused mass state [consisting of both $PS^-Li^+$ polymer and solid $(Me_2SiO)_3$ monomer]. However, as the exotherm rose above the $(Me_2SiO)_3$ melting point of 63° C., the system liquefied again and the $PS^{-Li+}$ dissolved in the siloxane monomer (now the solvent).

After the $PS^{-Li+}$ color had disappeared, 0.4 g additional diethoxyethane was added to the system (total promoter concentration = 3% by weight) and the temperature was increased to 80° C. and maintained there for 2 hours. The viscosity increased steadily during this period as the $(Me_2SiO)_3$ was consumed, eventually giving a viscous syrup of PS-PDMS polymer in trace monomer and promoter.

After two hours, the polymerization was terminated by addition of 1.2 mmoles of $Me_3SiCl$. The reaction was heated at 80° C. for 30 minutes and then cooled. The polymer was dissolved in tetrahydrofuran, precipitated with isopropanol and dried.

GPC analysis showed peak $M_s$ = 16,900 with MWD = 1.32. The PS block was calculated to be 8,200.

Example 4

This reaction was identical to Example 3 except that the PDMS block was allowed to polymerize for 3 hours. Peak $M_s$ = 20,800 for the final product with MWD = 1.35. More complete polymerization of the siloxane monomer was obtained in this experiment with longer reaction time as evidenced by the higher MW of the final product.

I claim:

1. A method for producing, in the presence of both monomers, a block copolymer of a first polymer block of anionic polymerization monomer(s) selected from the group consisting of vinyl aromatic hydrocarbons, conjugated dienes and mixtures thereof, and a second polymer block of polydimethysiloxane which comprises adding the anionic polymerization monomer(s), an organo alkali metal promoter, hexamethylcyclotrisiloxane and a polar promoter to a solvent at a temperature of 0° to 60° C., allowing the polymerization of the anionic polymerization monomer(s) to proceed until the color of the anionic polymerization monomer(s) - $Li^+$ spicies which is initially produced fades, then raising the temperature to 60° to 120° C. wherein the hexamethyl-cyclotrisiloxane polymerizes at the end of the first polymer block and then terminating the polymerization.

2. The process of claim 1 wherein the vinyl aromatic hydrocarbon is styrene, the styrene polymerization is at 0° to 25° C. and the polydimethylsiloxane polymerization is at 80° to 100° C.

3. A solventless method for producing, in the presence of both monomers, a block copolymer of a polymer block of monomers selected from the group consisting of vinyl aromatic hydrocarbons, conjugated dienes and mixtures thereof, and a block of polydimethysiloxane which comprises adding hexamethylcyclotrisiloxane, an organo alkali metal promoter, optionally, a conjugated diene and a polar promoter to the vinyl aromatic hydrocarbon at a temperature of 0° to 25° C. wherein the vinyl aromatic hydrocarbon serves as a solvent for the other components, allowing the polymerization of the vinyl aromatic hydrocarbon to proceed until the color of the vinyl aromatic hydrocarbon - $Li^+$ species which is initially produced fades wherein the heat of the reaction of the vinyl aromatic hydrocarbon polymerization melts the hexamethylcyclotrisiloxane which then serves as a solvent for the polyvinyl aromatic hydrocarbon produced, raising the temperature to 65° to 120° C. wherein the hexamethylcyclotrisiloxane polymerizes at the ends of the polyvinyl aromatic hydrocarbon polymer blocks and terminating the polymerization.

4. The process of claim 3 wherein the vinyl aromatic hydrocarbon is styrene, the styrene polymerization is at 0° to 10° C. and the polydimethylsiloxane polymerization is at 80° to 100° C.

* * * * *